United States Patent

Cittadini et al.

[11] Patent Number: 5,900,196
[45] Date of Patent: May 4, 1999

[54] PROCESS AND APPARATUS FOR FORMING ITEMS HAVING LAYERS WITH CONTROLLED THICKNESS

[75] Inventors: Paolo Cittadini, Luvinate; Giancarlo Buzzoni, Barasso, both of Italy

[73] Assignee: Industrie Ilpea S.p.A., Malgesso, Italy

[21] Appl. No.: 08/930,586

[22] PCT Filed: Apr. 11, 1996

[86] PCT No.: PCT/EP96/01583

§ 371 Date: Oct. 20, 1997

§ 102(e) Date: Oct. 20, 1997

[87] PCT Pub. No.: WO96/33060

PCT Pub. Date: Oct. 24, 1996

[30] Foreign Application Priority Data

Apr. 19, 1995 [IT] Italy .................................. MI95A0789

[51] Int. Cl.⁶ ............................ B29C 44/06; B29C 44/12
[52] U.S. Cl. .................. 264/46.5; 249/115; 264/46.4; 264/255; 264/271.1; 264/302; 425/144; 425/414; 425/468
[58] Field of Search .................. 264/46.4, 46.6, 264/255, 302, 271.1, 46.5; 249/142, 184, 115; 425/144, 435, 414, 468

[56] References Cited

U.S. PATENT DOCUMENTS

| | | | |
|---|---|---|---|
| 3,103,428 | 9/1963 | Stello et al. | 249/142 |
| 3,856,256 | 12/1974 | Celesti | 249/184 |
| 4,810,452 | 3/1989 | Taillefert et al. | 264/46.4 |
| 4,946,638 | 8/1990 | Takamatsu | 264/302 |
| 5,013,508 | 5/1991 | Troester | 264/46.6 |
| 5,061,419 | 10/1991 | Kouda et al. | 264/46.6 |
| 5,395,578 | 3/1995 | Buzzoni et al. | 264/302 |
| 5,445,510 | 8/1995 | Jackson, Jr. | 425/435 |
| 5,525,284 | 6/1996 | Grimmer | 264/302 |
| 5,580,501 | 12/1996 | Gallagher et al. | 264/46.4 |

FOREIGN PATENT DOCUMENTS

| | | | |
|---|---|---|---|
| 28 17 030 | 10/1978 | Germany | 264/302 |
| 62-62717 | 3/1987 | Japan | 264/302 |

*Primary Examiner*—Allan R. Kuhns
*Attorney, Agent, or Firm*—Oblon, Spivak, McClelland, Maier & Neustadt, P.C.

[57] ABSTRACT

A process for forming such manufactured items as imitation leather, or the like, from thermoplastic materials, thermosetting materials or elastomers, having at least one foamed layer, characterized in that said process comprises the following steps: a) forming, inside a mold for slush molding, a first layer of material which will constitute the top (i.e., the visible) layer of the finished manufactured item, b) by means of a further slush molding step forming a second layer, of foaming material, on said first layer, c) under high temperature conditions, completing the consolidation by gelation of said layers and foaming said second layer, by suitable means, in order to obtain predetermined thicknesses and shapes of said foamed layer, with the so formed layered material a backing means made from a rigid material being coupled, wherein said suitable means for obtaining predetermined thicknesses and shapes of said foamed layer are constituted either by a counter-mold or by said backing means made of rigid material.

6 Claims, 2 Drawing Sheets

PROCESS AND APPARATUS FOR FORMING ITEMS HAVING LAYERS WITH CONTROLLED THICKNESS

BACKGROUND OF THE INVENTION

Field of the Invention

The process of slush moulding plastisol or PVC powder or other thermoplastic, thermosetting, elastomeric materials is generally known. Such a slush moulding process includes the steps of filling a pre-heated metal mould with the polymeric material in powder or liquid form, removing the excess of liquid or solid material, and subsequently heating the mould in order to complete the gelation or melting and/or cross-linking of the material adhering to said mould. The mould is then cooled and the finished item is de-moulded.

DISCUSSION OF THE BACKGROUND

Obtaining imitation leather with two or more colours by slush moulding techniques is known as well, e.g., from the processes disclosed in European patent 476,742 and WO 94/12331 to the same Applicant.

In particular in the automobile industry, manufactured articles are known which display a surface which perfectly reproduces the surface of a natural leather, which are obtained in their desired end shape according to the designer's pattern, inside a suitable foaming mould, from foamed soft polyurethane, and a layer of said polyurethane is interposed between the imitation leather and a backing means. Such a backing means can be of steel, either thermoplastic or thermosetting resin, composite materials or still others.

The surface of the resulting article has a desirable, appreciated soft touch for articles for body trimming and furniture in general. Furthermore, the layer of foamed material dampens the impact against the finished article and consequently performs also a safety function.

The technique of obtaining, by calendering, a soft, flat imitation leather coupled with a foamed material, and, from said imitation leather, thermoforming the finished article, and, by using glues, applying it onto the backing means, or coupling it during the thermoforming step with the backing means, previously coated with heat activatable glues, is known as well. In the latter case, the heat contained in the thermoformed article is enough in order to cause the coupling to take place. However, the finished article produced by means of this technique will have regions with a drawn surface (including the foamed portion), and consequently liable to undergo shrinking, showing lower abrasion strength and different thickness values, and being thinner in critical regions.

The purpose of the slush moulding technique is to obtain such a kind of imitation leather of a soft type, in particular for coating dashboards and other parts of body trimming, without the drawbacks which affect the thermoforming technique, i.e., non-uniform thickness of the imitation leather and arising of congealed stresses and consequent shrinkage and cracking under high temperature conditions.

SUMMARY OF THE INVENTION

The purpose of the present invention is of providing dashboards, doors or other automobile body trimming parts coated with imitation leather obtained by means of said slush moulding technique, with no need for having to foam the imitation leather on a suitable facility by using foamed polyurethane. Such an operation is in fact expensive and, besides generating scraps and wastes, it requires particular characteristics of mechanical strength and resistance of imitation leather, which increases the cost thereof.

In order to achieve such a purpose and other advantages which will become clearer from the following disclosure, the present invention proposes a process for forming such manufactured items as imitation leather, or the like, from thermoplastic materials, thermosetting materials or elastomers, having at least one foamed layer, characterized in that said process comprises the following steps:

a) forming, inside a mould for slush moulding, a first layer of material which will constitute the top layer, i.e., the visible layer, of the finished manufactured item, b) by means of a further slush moulding step forming a second layer, of foaming material, on said first layer, c) under high temperature conditions, completing the consolidation by gelation of said layers and foaming said second layer, by suitable means, in order to obtain predetermined thicknesses and shapes of said foamed layer, with the so formed layered material a backing means made of a rigid material being coupled, wherein said suitable means for obtaining predetermined thicknesses and shapes of said foamed layer are constituted either by a counter-mould or by said backing means made of rigid material.

Said thermoplastic, thermosetting or elastomeric materials can be selected from a wide range of resins, both in powder and in liquid form.

Said second layer of foaming material will be obtained by starting from an analogous or compatible material formulated with foaming agents, such as, e.g., azodicarbonamide, sodium hydrogencarbonate, citric acid, or any other suitable agents.

Said first layer can be formed in one single colour, or with two or more colours, for example by suitably using the processes disclosed in the above mentioned commonly owned patents, i.e. European patent 476,742 or patent WO 94/12331.

In the process according to the present invention, the second layer—i.e., the foamed layer—is formed on the face of the first layer which, in the finished article, will be the non-visible surface.

According to the purposes of the present invention, it is essential that in the step c) of forming the second layer of foaming material, such a layer develops by foaming of the foaming material according to a homogeneous, controlled thickness of a predetermined value and selected from time to time according to the requirements the product should comply with.

Owing to such a reason, the process of the present invention can provide for using a counter-mould the outline of which reproduces the contour of said backing means of rigid material, so that said counter-mould is capable of reproducing the outline of said backing means on the surface of the second layer, of foamed material, which is opposite to said counter-mould. Therefore, such a surface will be hollow and complementary to the surface of the backing means which it is designed to receive.

According to a first embodiment of the process according to the present invention using said counter-mould, the process consists of the following steps, carried out sequentially:

a) forming, inside a mould for slush moulding, a first layer of material which will constitute the top layer, i.e., the visible layer, of the finished manufactured item, b) soon after a), by means of a further slush moulding step forming a second layer, of foaming material, on said first layer, b') coupling said counter-mould with said mould, c) under high temperature conditions, for example, inside an oven, completing the consolidation by gelation of said layers and the foaming of said second layer, d) uncoupling said mould and counter-mould, e) cooling said mould, f) de-moulding the manufactured item (imitation leather with a foamed layer having a complementary outline to the outline of the backing means), g) coupling said backing means of rigid material with the resulting layered material, by entering said backing means inside the corresponding hollow generated by said counter-mould on the foamed layer face opposite to it, by using suitable adhesion means.

According to another embodiment of the just disclosed process, after said step b) said mould is charged to an oven in order to perform said step c), said mould is then extracted from the oven and said counter-mould is coupled with said mould according to step b'), then mould and counter-mould are cooled and are uncoupled, by acting as disclosed in above steps f) and g).

Using the counter-mould as defined hereinabove is necessary according to the process of the present invention whenever the forming mould used for slush moulding the several materials displays undercuts, or anyway problems exist for removing the finished article from said mould.

If, on the contrary, such a mould does not display undercuts or no such problems exist, according to a further embodiment of the present invention, said backing means of rigid material which must be united to the imitation leather in order to produce the finished article can be directly used with counter-mould functions.

In fact, in such a case, said rigid backing means can be coupled with the layered material directly inside the mould, and the whole article is then de-moulded.

In such a case, the process according to the present invention can therefore imply an embodiment comprising the following steps:

a) forming, inside a mould for slush moulding, a first layer of material which will constitute the top layer, i.e., the visible layer, of the finished manufactured item, a') charging to said mould said backing means made of rigid material, b) by means of a further slush moulding step forming a second layer, of foaming material, on said first layer, in such a way said second layer substantially embedding said backing means of rigid material, c) under high temperature conditions, completing the consolidation by gelation of said layers and foaming said second layer, d) cooling said mould and de-moulding the thus finished manufactured article containing said rigid backing means embedded therein.

According to an alternative route, a different embodiment of the process according to the present invention is provided, which implies the following sequential steps:

a) forming, inside a mould for slush moulding, a first layer of material which will constitute the top layer, i.e., the visible layer, of the finished manufactured item, b) by means of a further slush moulding step forming a second layer, of foaming material, on said first layer, b') on said second layer positioning said backing means of rigid material, suitably treated with adhesion promoting means such as, e.g., heat-activatable ("hot-melt") glues, facing said second layer, c) completing at high temperature, for example inside an oven, the consolidation by gelation of said layers and foaming said second layer, d) cooling said mould and de-moulding the thus finished manufactured article containing said rigid backing means embedded therein.

According to a further embodiment of the process of the invention, as regards the just disclosed embodiment, the step c) could be carried out first, and the step b') could be carried out thereafter.

BRIEF DESCRIPTION OF THE DRAWINGS

In order to better understand the characteristics and advantages of the present invention as disclosed hereinabove, an exemplifying, non-limitative embodiment thereof is reported in the following by referring to the figures of the accompanying drawings.

Such an exemplifying embodiment relates to one of the embodiments of the invention as defined above.

DESCRIPTION OF THE PREFERRED EMBODIMENTS

Figure 1:
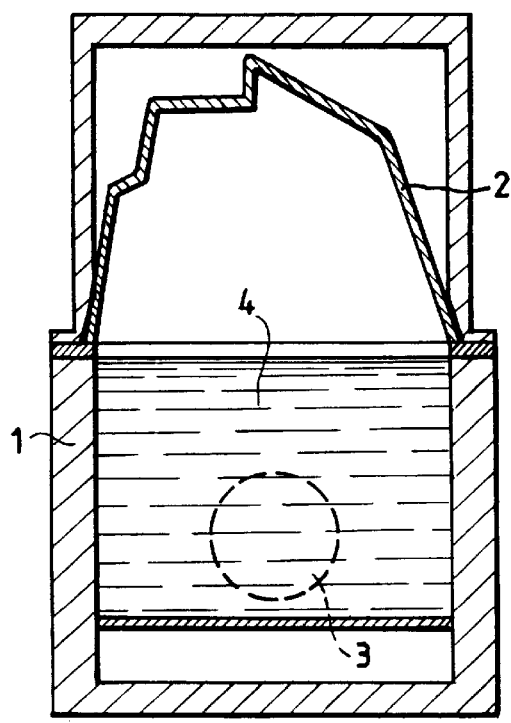
FIG. 1 displays a cross-sectional view of a mould according to the present invention at the time when it is fastened to a tank containing the polymeric material.
Figure 2:
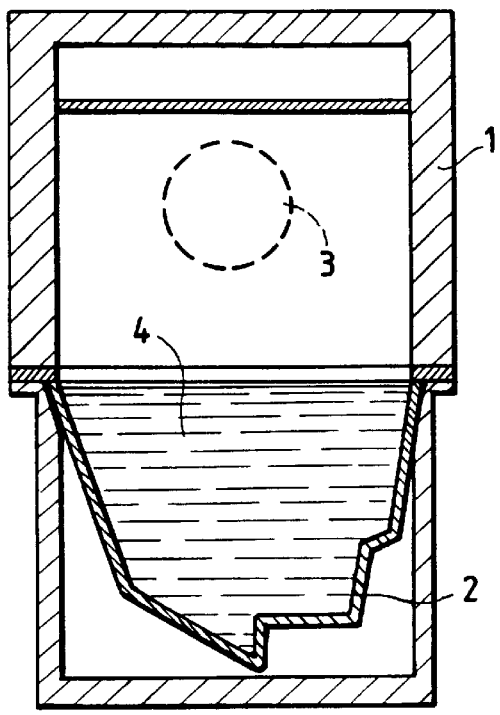
FIG. 2 shows a cross-sectional view with the mould-tank system rotated by 180° (i.e., upside down) in order to perform the slush moulding.

Referring to FIG. 1, the reference numeral (1) indicates a tank to be used for slush moulding, on which a mould (2) is assembled in its operating position. Such a mould comes from a pre-heating oven, or it can be heated by means of circulating oil flowing inside a gap between the inner and the outer shells. After the mould being fastened onto the tank, in which a shaft for rotation (3) is shown in short-dashed line, the polymeric material (which can be either a powder or a liquid material) (4), by means of a rotation of 180° (or other suitable rotation type) will be brought into contact with the mould as shown in FIG. 2, for the necessary time for the desired material amount to adhere to the hot mould.

Figure 3:
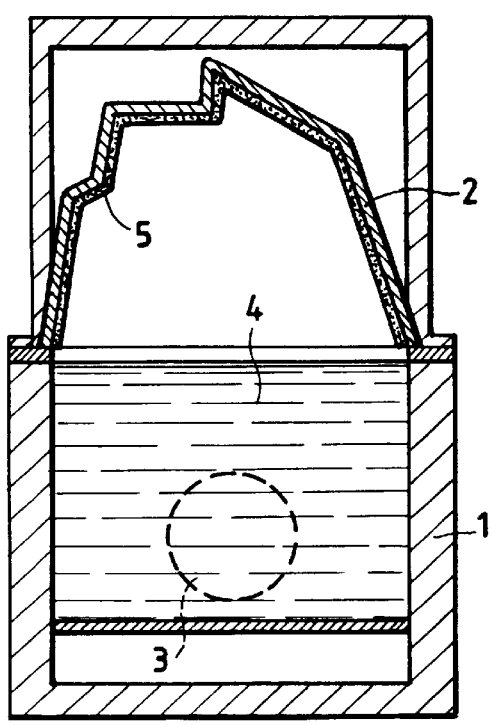
FIG. 3 shows a cross-sectional view of the mould to which the first layer adhered, returned to its starting position.
Figure 4:
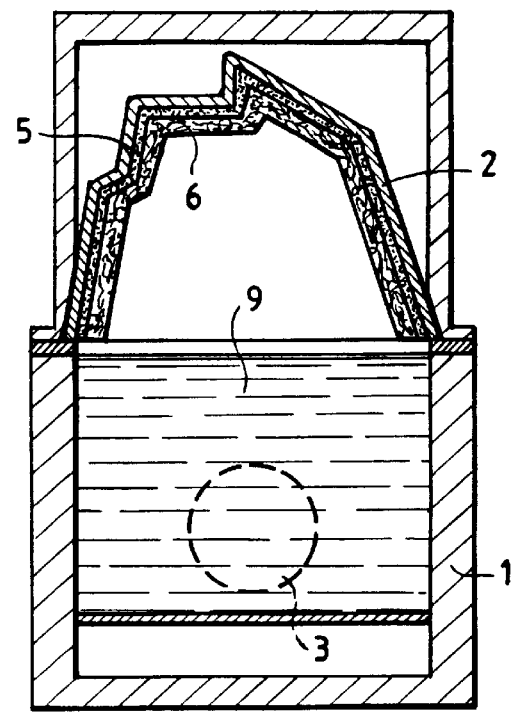
FIG. 4 displays a similar cross-sectional view after the second operation of slush moulding was carried out, with the layer of foaming material remained adhering to the first layer.
Figure 5:
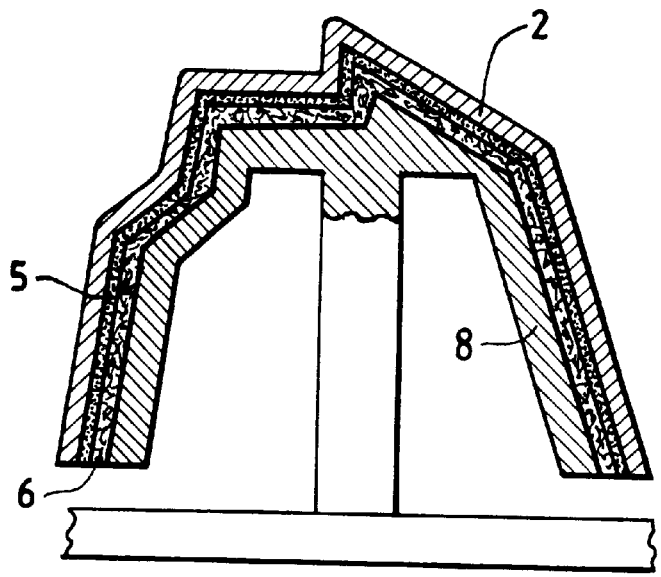
FIG. 5 shows, with a schematic cross-sectional view, the mould/counter-mould assembly.

After a further rotation of 180° (or other suitable rotation type), the mould-tank assembly is returned into its initial position and the situation will be as shown in FIG. 3, in which the first layer of the imitation leather composite is indicated with the reference numeral (5). Immediately after, the mould (2) is fastened onto the moulding tank (1) containing a foaming material (9), the resulting assembly is rotated by 180°, is kept in its upside down position during the necessary time, and then is rotated by 180° once more in order to cause the excess fluid to drain; at the end, the situation will be as schematically shown in FIG. 4, in which, coupled with the first solid layer of the imitation leather composite (5), a second, foamed layer (6) has been caused to adhere. Now, in order to obtain regular thicknesses and a homogeneous conformation of the foamed layer (6), a counter-mould (8) provided with a release surface will be suitably applied as schematically shown in FIG. 5.

The mould (2) bearing the counter-mould (8) will be charged now to a gelation oven (or, according to an alternative route, the operator will wait until the circulating hot oil will complete this operation) in order to complete the material melting and layer (6) foaming.

Figure 6:
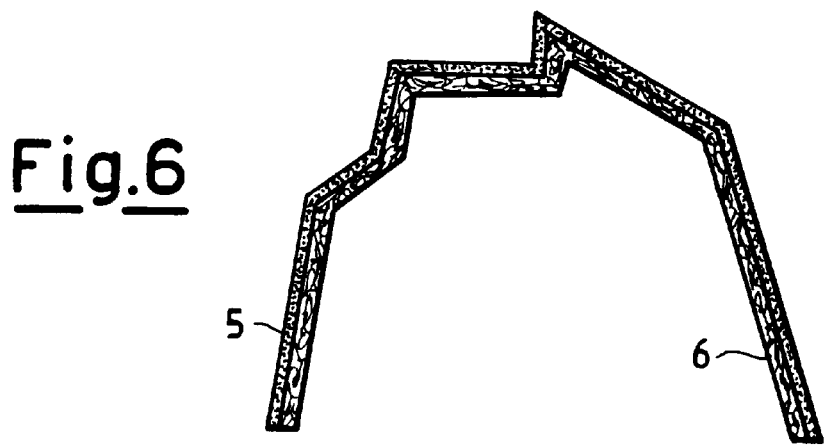
FIG. 6 shows a cross-sectional view of the finished imitation leather article.
Figure 7:
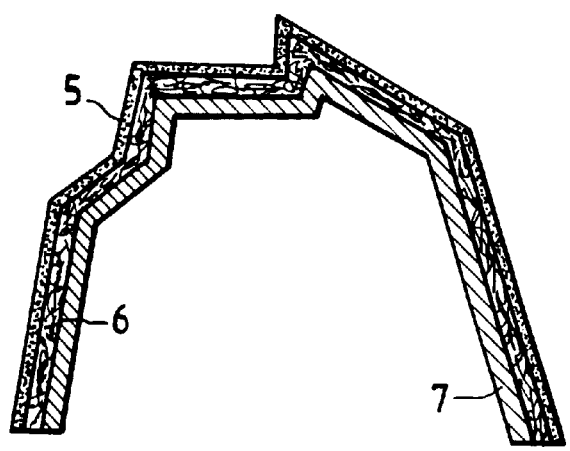
FIG. 7 shows a cross-sectional view of the imitation leather to which the backing means was caused to adhere.

When the moulding and foaming step is over, several alternative operating ways are possible according to the particular method which the operator wishes to use:

- mould and counter-mould can be uncoupled in order to de-mould the produced imitation leather after mould cooling, with a subsequent operation of coupling with a backing means (7), by means of a is suitable adhesion promoting system (primer treating, or bonding with a hot-melt glue under pressure, or still other systems);
- according to an alternative route, as disclosed hereinabove, the layered imitation leather (5)–(6) is coupled with the backing means by taking advantage of the heat supplied by the same imitation leather and by the gelation, after preliminary treatment of said backing means with special hot-melt adhesives. The mould is then cooled and the finished article is de-moulded, ready for assembly, and will be as schematically shown in FIG. 6, in which the backing means (7) is shown.

Hereinabove, it has been stated that the process according to the present invention requires the use of said counter-mould in particular in the event when said mould displays undercuts. In fact, such undercuts would prevent the foamed imitation leather inside which the backing means is already embedded, from being de-moulded.

In that case, said counter-mould can be suitably provided with retractable and extendible parts.

For example, a counter-mould will be suitable which has a plurality of inserts made from a rigid material according to a predetermined distribution, with each of said inserts being independently controlled and actuated by an actuator which is capable of extending or retracting the parts of said counter-mould towards the inner wall of the hollow opposite to said undercuts, so as to be capable of suitably entering them and subsequently exiting from them.

For a description of the mechanical structure of such a counter-mould, reference is made, for example, to the disclosure of the above cited commonly owned patent WO 94/12331.

Such a counter-mould can suitably be provided with a release surface facing the layer of foamed material with which it is coupled.

The counter-mould can then be suitably thermostatted, so as to be capable of constantly controlling the temperature conditions at which said counter-mould operates.

The invention, as substantially disclosed hereinabove, can be implemented according to a wide range of embodiments, besides those embodiments which are recited above.

For example, using one single type of thermoplastic or thermosetting or elastomeric material can be provided in order to produce both the outer layer, i.e., the first skin layer, and the foamed layer, i.e., the second layer of the imitation leather.

According to an alternative embodiment, the material used to produce the first layer and the foaming material used to form the second layer can be different.

The top, i.e., visible layer, as briefly mentioned hereinabove can be also formed in two or more colours, in this case implementing, e.g., the process disclosed in commonly owned European patent 476,742.

We claim:

1. Process for forming manufactured items from thermoplastic materials, thermosetting materials or elastomers, having at least one foamed layer, said process comprises the following steps:

forming, inside a mould for slush moulding, a first layer of material which constitutes the top layer of the finished manufactured item, charging to said mould said backing means made of rigid material, by means of a further slush moulding step forming a second layer, of foaming material, on said first layer, in such a way said second layer substantially embedding said backing means of rigid material, under high temperature conditions, completing the consolidation by gelation of said layers and foaming said second layer, by suitable means, in order to obtain predetermined thicknesses and shapes of said second layer, coupling said second layer to a backing means made of a rigid material, wherein said suitable means for obtaining predetermined thicknesses and shapes of said second layer are constituted either by a counter-mould or by said backing means made of rigid material, and cooling said mould and de-moulding the thus finished manufactured article containing said rigid backing means embedded therein.

2. Process according to claim 1, characterized in that said second layer of foaming material is formed by slush moulding inside said mould while the thickness of said layer which is developing by foaming being kept controlled, by means of a counter-mould the contour of which reproduces the shape of said backing means of rigid material, so that said counter-mould is capable of reproducing said contour on the surface of said second foamed layer which is opposite to it.

3. Apparatus for carrying out the process according to claim 1, characterized in that said apparatus comprises a mould for slush moulding and a thermostatted counter-moulding the outline of which reproduces the shape of said backing means of rigid material, so that said counter-moulding reproduces said shape on the surface of said second foamed material facing it.

4. Counter-moulding for an apparatus according to claim 3, characterized in that it is provided with a release surface.

5. Counter-moulding for an apparatus according to claim 3, characterized in that it is mobile.

6. Counter-mould for an apparatus according to claim 3, characterized in that it is equipped with a plurality of parts which can either be extended or retracted under the action of mechanical or pneumatic actuators.

* * * * *